H. FORESMAN.

Harvester Rake.

No. 14,861.

Patented May 13, 1856.

UNITED STATES PATENT OFFICE.

HUGH FORESMAN, OF ENON, OHIO.

IMPROVEMENT IN SELF-RAKING ATTACHMENTS TO HARVESTERS.

Specification forming part of Letters Patent No. 14,861, dated May 13, 1856.

*To all whom it may concern:*

Be it known that I, HUGH FORESMAN, of Enon, in the county of Clarke and State of Ohio, have invented a new and useful Apparatus for Raking Grain from the Platform of a Reaping-Machine; and I do hereby declare that the following is a full, clear, and exact description of the construction and operation of the same, refernce being had to the annexed drawings, making a part of this specification, in which—

Figure 1:
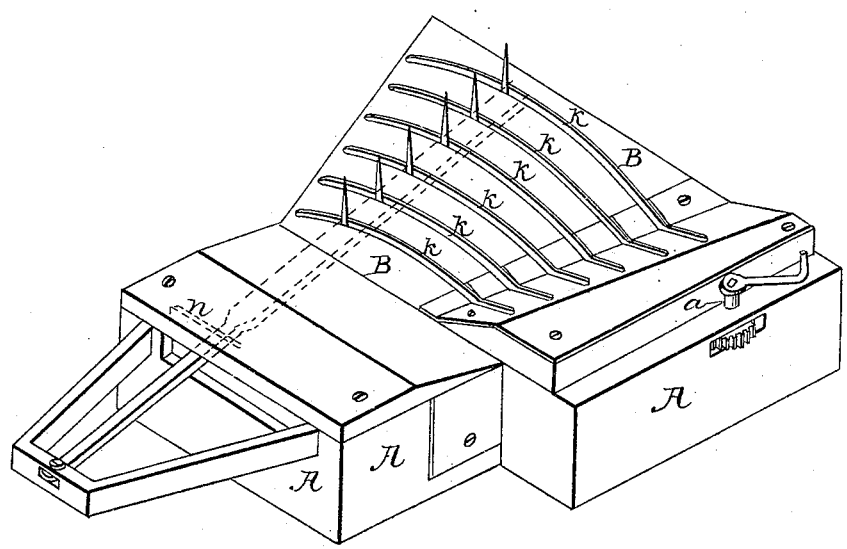
Figure 2:
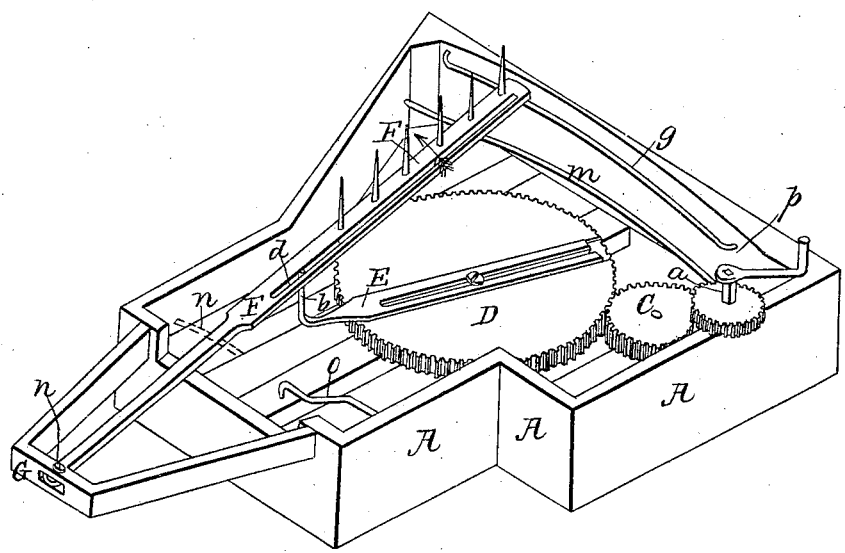

Figure 1 represents a perspective of said raking apparatus. Fig. 2 represents a perspective view of the same, exposing those parts of the machinery which are inclosed in the casing.

The nature of my invention relates to the manner of arranging the several part of a self-raker underneath the platform of a reaping-machine, and thus obviating the obstructions and difficulties caused in those machines where the rakers are above the platforms.

A represents a casing containing the raker and the entire apparatus by which it is operated. It is attached to the reaper in such a manner that its top B is flush with or constitutes in itself the platform of the reaper, on which the cut grain falls. Motion is imparted to the machine from the driving-wheel of the reaper by any of the known contrivances to the crank-shaft $a$, which transmits motion to pinion C, working into a cogged wheel, D, and imparting to D a slow revolving motion. To the cogged wheel D is attached an adjustable crank, E, the pin $b$ of which slides in a slot, $d$, of the rake F. Said rake is attached at one end to a frame, G, by means of a bolt, $h$, on which it turns as its fulcrum, and is supported at its other end by a rodway or guide, $g$, which is bent so as to conform to a circle described from the center $h$, and permits the rake to be moved in a reciprocating circular manner. As shown in Fig. 1, the teeth of the raker project through the platform B and move in said platform in circular slots $k$, thus carrying before them the grain which lies on the platform. When the wheel D revolves the pin $b$ moves in the slot $d$ and operates the rake in the manner above described.

It is obvious that this raker should only operate in one direction to keep the platform clean; and it is thus necessary that it should be lowered at each half-revolution of the wheel D, so as to be brought out of the reach of the grain, and thus permit it to accumulate during said interval. Suppose the raker to be moving in the direction of the arrow, it will, when it arrives at the end of the circular rod $g$, fall down onto another similar rodway or guide, $m$. This operation is facilitated by means of a spring, $n$, which is fastened to the top of the casing, and presses the raker downward as soon as it comes in contact with the same. The raker, when on the lower rod, $m$, returns in that position, and is during that time out of the reach of the grain on the platform B, and moves on until it arrives at the inclined rod $o$, on which incline it slides up, passes by the end $p$ of the circular rod $g$, and is finally lifted onto it, where it is again in contact with and can operate upon the grain, as described above.

The rake has been described as receiving its motion from the driving-wheel. To avoid obliquity of terms, $t$ is stated that the motion may be taken from the main supporting and driving wheel, or any other moving part of the machine, through the intervention of any of the well-known mechanical means used for such purposes.

Having thus fully described the nature of my invention, what I claim therein as new, and desire to secure by Letters Patent, is—

The combination of the wheel D, adjustable crank E, slotted rake F, and guides or ways $g\, m$, for giving the rake its traversing and rising-and-falling motion, substantially as herein described.

HUGH FORESMAN.

Witnesses:
SAML. SHELABARGER,
P. SPINING.